T. M. CASS.
SAW TESTER.
APPLICATION FILED JAN. 2, 1912.
1,052,568.
Patented Feb. 11, 1913.
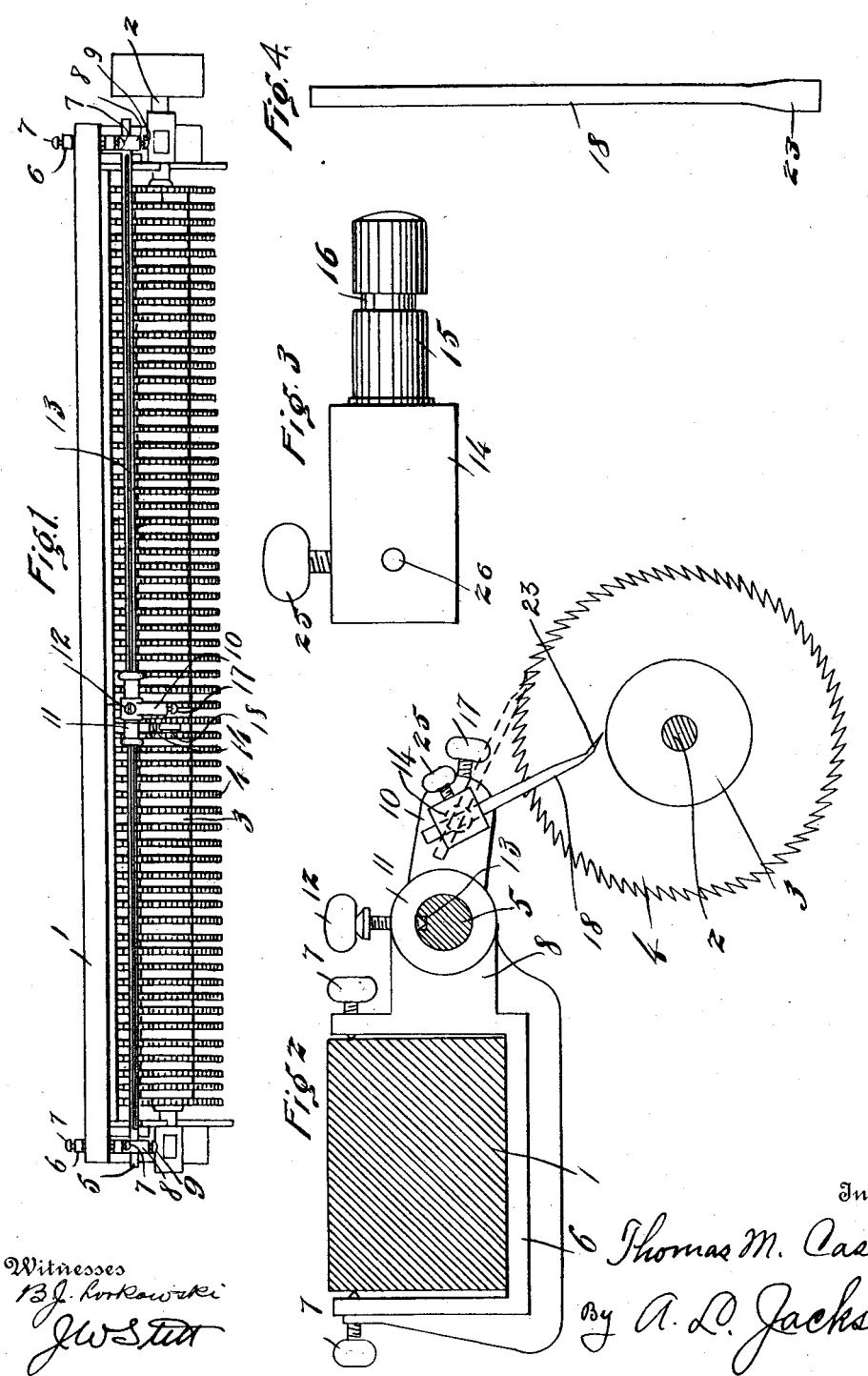

UNITED STATES PATENT OFFICE.

THOMAS M. CASS, OF FORT WORTH, TEXAS.

SAW-TESTER.

1,052,568.  Specification of Letters Patent.  Patented Feb. 11, 1913.

Application filed January 2, 1912. Serial No. 669,083.

*To all whom it may concern:*

Be it known that I, THOMAS M. CASS, a citizen of the United States, residing at Fort Worth, in the county of Tarrant and State of Texas, have invented certain new and useful Improvements in Saw-Testers, of which the following is a specification.

My invention relates to devices for testing and training cotton gin saws and similar saws, and the object is to provide simple and durable devices which can be easily operated and by which gin saws can be trained with extreme accuracy.

The improvements comprise devices for detecting the cupped portions of the gin saws and also for detecting the kinks near the peripheries of the saws.

If a gin saw does not run true a heavy damp roll of cotton will press the saw against the spacing block and thus cup the saw. Increased cupping of the saws and badly cupped saws often are the cause of gins being burned.

The object of this invention is to provide means for correcting the saws.

Other objects and advantages will be fully explained in the following description and the invention will be more particularly pointed out in the claims.

Reference is had to the accompanying drawings which form a part of this application and specification.

Figure 1 is a plan view of the saw testing devices mounted on the breast bar of a gin. Fig. 2 is a vertical section of a gin breast bar and a gin cylinder, showing the testing and training devices applied. Fig. 3 is a detail view of the tool chuck. Fig. 4 is a front view of a testing tool.

Similar characters of reference are used to indicate the same parts throughout the several views.

The drawings show sufficient parts of a gin stand to illustrate the invention. A breast bar 1 is shown and a gin cylinder, consisting of shaft 2, spacing blocks 3, and saws 4, is shown in its relative position to the breast bar 1. The training devices are mounted for operation by means of a shaft 5 and brackets 6 which engage the breast bar 1. The brackets are held on the breast bar 1 by set screws 7 which screw through the arms of the bracket and press against the breast bar. The brackets 6 have formed thereon bearings 8 for the shaft 5 and the shaft 5 is held rigid in the bearings 8 by means of set screws 9. A chuck holder 10 is mounted on the shaft 5 by means of a sleeve 11 and the sleeve 11 is adjustable on the shaft and held at any point on the shaft by means of thumb screw 12 which engages a groove 13 in the shaft so that the sleeve 11 cannot turn on the shaft 5. The shaft 5 is prevented from turning in its bearings 8 by the thumb screws 9. A chuck 14 is adjustably mounted in the holder 10 and the chuck has a shank 15 which is cylindrical and has an annular groove 16. The chuck is held in the holder by means of a thumb screw 17 which engages the groove 16. The chuck 14 will not be displaced when the screw 17 is loosened for adjustment. The chuck can be turned in its bearing and the screw 17 will hold the chuck in its bearing by reason of the groove 16 while being turned. The object in turning the chuck 14 is to adjust the same for using the testing tool 18 in the different positions.

In Fig. 2 the tester 18 is shown down adjacent to the spacing block 3 for the purpose of getting the correct center of the saw. After this center has been obtained the tester is changed by bringing the same near the periphery of the saw, as shown by dotted outline in Fig. 2. If the saw is found to be cupped, the cup is removed by the usual trainer. If the saw rubs hard on the training tool 18, or rather on the blade 23 of tester or needle, the edge of the saw is forced away from the needle by pushing or forcing the handle of the trainer from the needle. If the saw runs too far from the blade the saw must be forced toward the needle by means of the trainer. This operation is kept up until the saw runs true or until the saw is the same distance from the needle around the entire periphery of the saw.

For adjusting the testing tools to different saws, the chuck holder 10 is moved laterally on the shaft 5 by reason of the sleeve 11, after loosening the thumb screw 12. Before the tool 18 can be moved laterally, the chuck 14 must be released by loosening the thumb screw 17 so that the tool can be raised from between the saws. Even after the tool 18 has been moved laterally and brought down between two saws, the sleeve 11 must be moved until the blade 23 is brought to the side of the saw to be trained before the screw 12 is tightened.

When a saw is cupped or dished, a heavy roll of cotton will make the saw press against the ribs of the gin. The friction of the saw against the ribs frequently strikes fire and the gin is burned or set on fire. The object of the tools herein described is to train the saws so that thy will run true and not rub against the ribs.

Having fully described my invention, what I claim as new and desire to secure by Letters Patent, is,—

1. Saw training devices for cotton gin saws and similar saws comprising two brackets, said brackets being removably secured to a bar of a machine, to which a saw cylinder to be trained belongs, and which bar is situated parallel to said saw cylinder, two bearings, carried by said brackets, a shaft, being adjustably mounted in said bearings, and means, adjustably mounted upon said shaft for carrying a testing tool, by means of which cupped portions in a saw disk and kinks near the periphery of a saw may be detected.

2. Saw training devices for cotton gin saws and similar saws comprising two brackets, said brackets being removably secured to a bar of a machine to which a saw cylinder to be trained belongs and which bar is situated parallel to said saw cylinder, two bearings carried by said brackets, a shaft being adjustably mounted in said bearings, a chuck holder, being adjustably mounted upon said shaft, a chuck being adjustably mounted in said chuck holder, and a testing tool, by means of which cupped portions in a saw disk and kinks near the periphery of a saw may be detected, said testing tool being adjustably mounted in said chuck.

In testimony whereof, I set my hand in the presence of two witnesses, this 16th day of December, 1911.

THOMAS M. CASS.

Witnesses:
A. L. JACKSON,
J. W. STETT.

Copies of this patent may be obtained for five cents each, by addressing the "Commissioner of Patents, Washington, D. C."